March 14, 1933.  J. A. BOWER  1,901,281
TILE FEEDER
Filed June 1, 1931  4 Sheets-Sheet 1
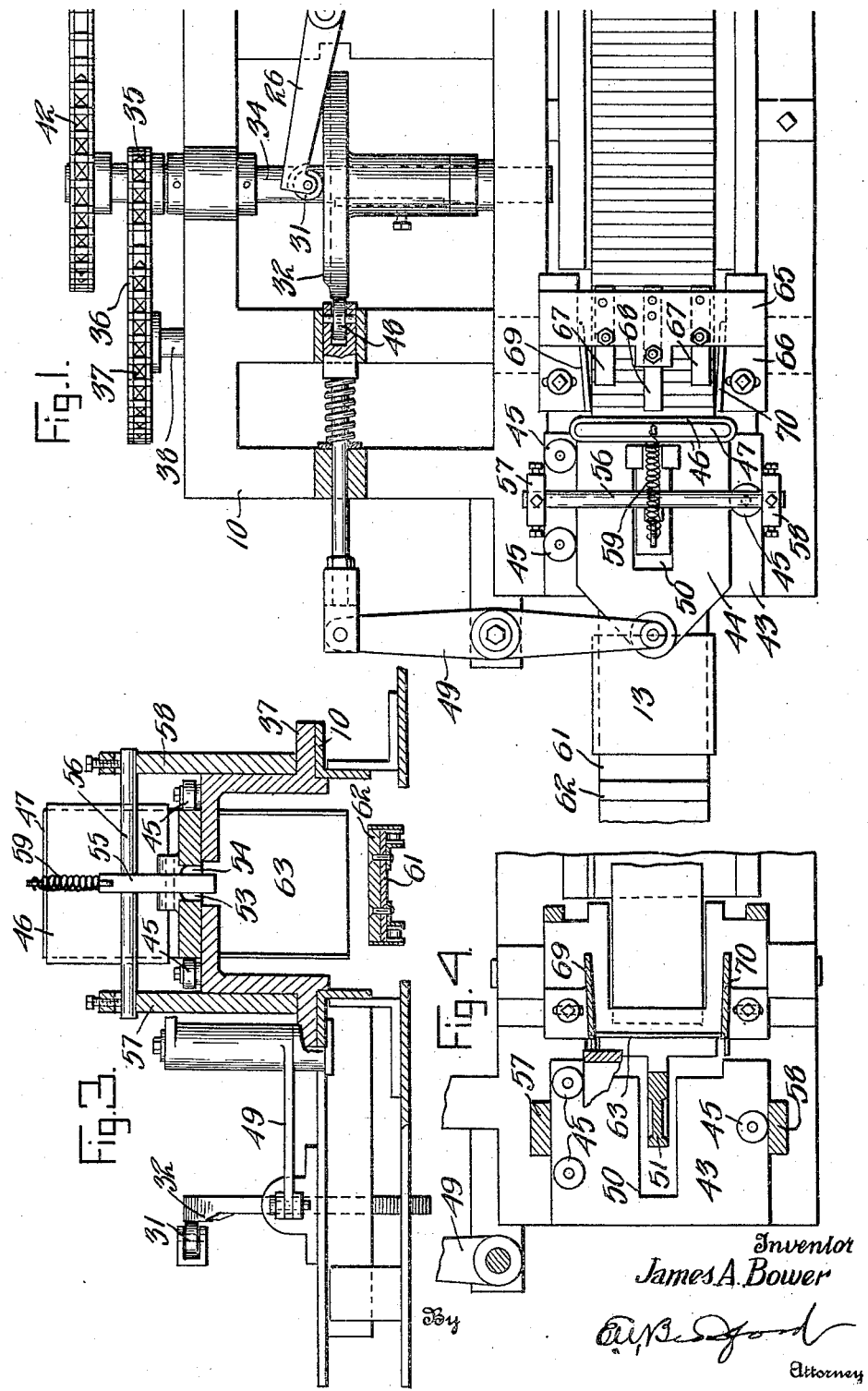
Inventor
James A. Bower
By
Attorney

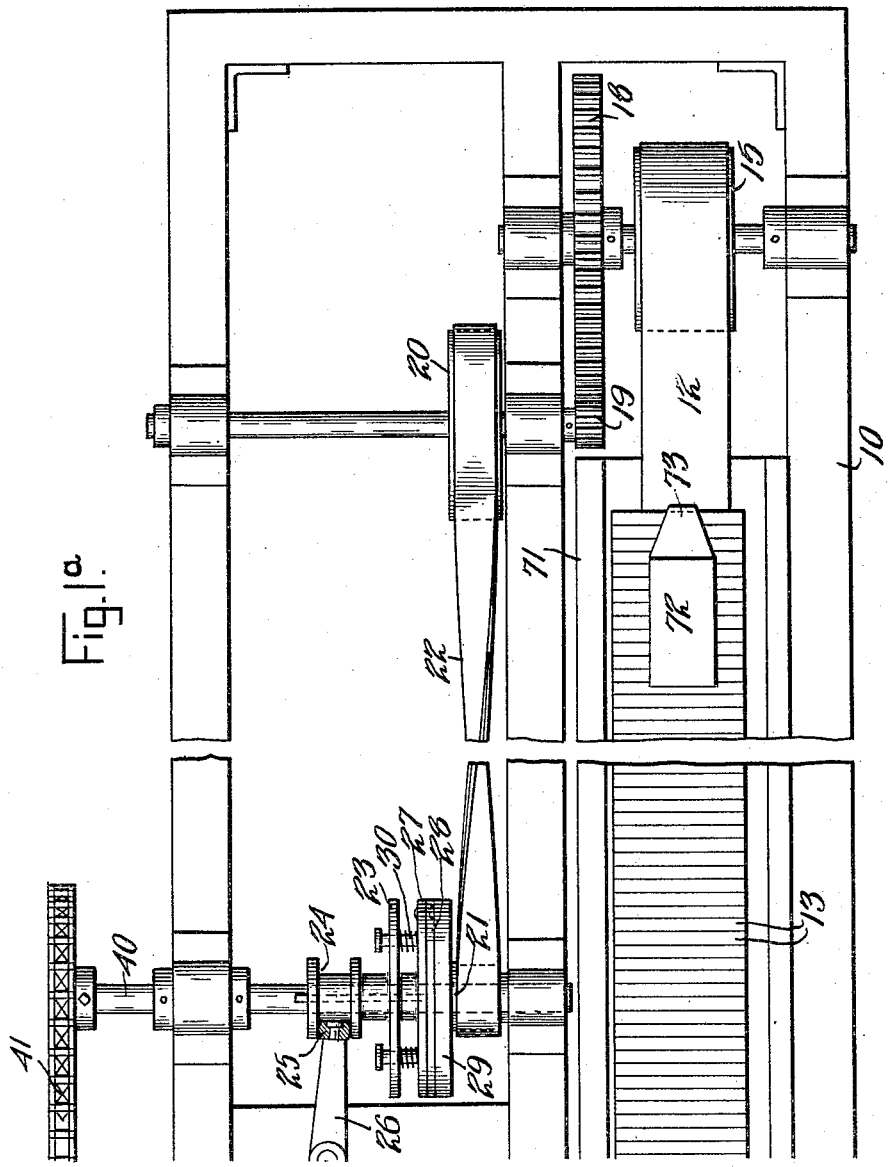

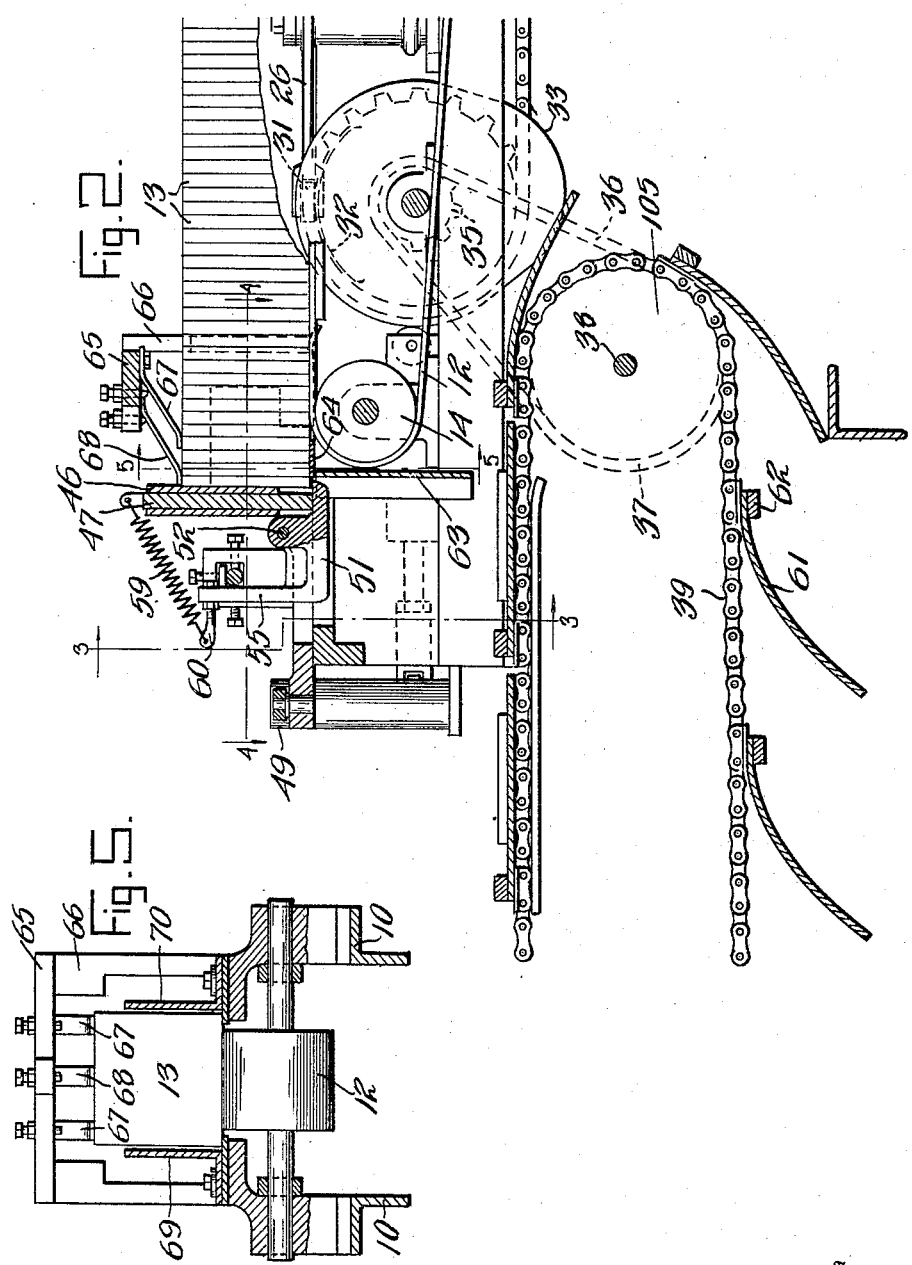

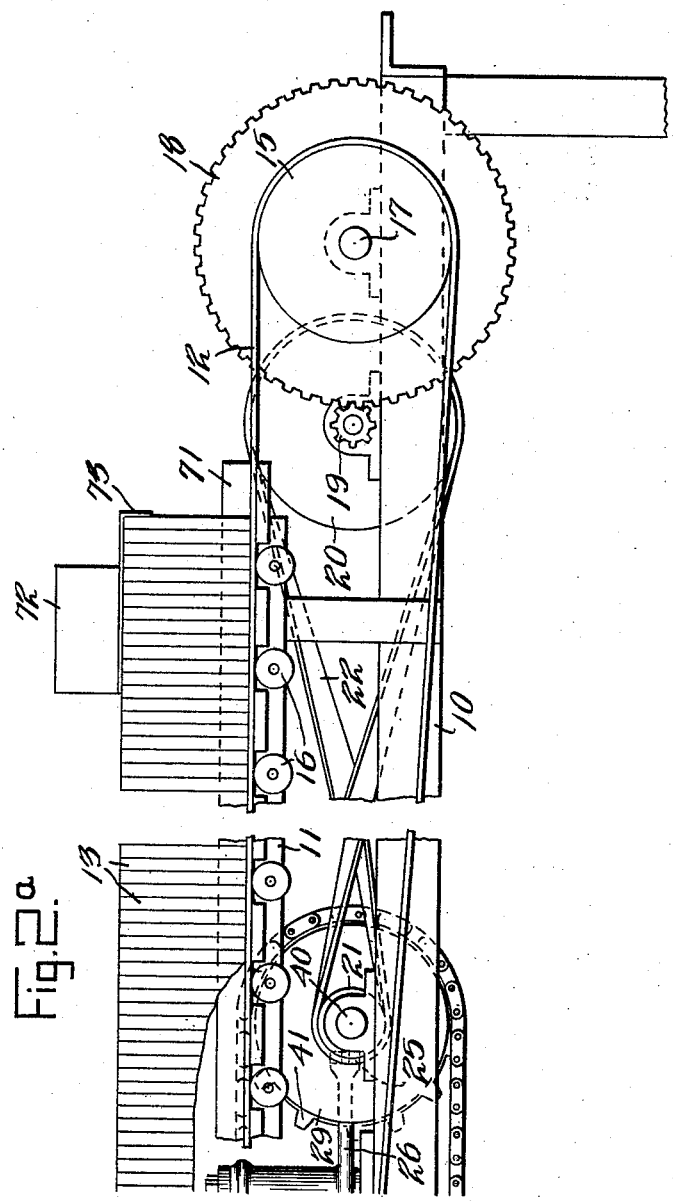

Patented Mar. 14, 1933

1,901,281

UNITED STATES PATENT OFFICE

JAMES ARTHUR BOWER, OF ANDERSON, INDIANA, ASSIGNOR TO THE NATIONAL TILE COMPANY, OF ANDERSON, INDIANA, A CORPORATION OF OHIO

TILE FEEDER

Application filed June 1, 1931. Serial No. 541,496.

This invention relates to machines for feeding tile upon a fast moving conveyor and to feed them in proper time so that they may be positioned upon the conveyor in the proper spaces provided for them on the conveyor.

The object of the invention is to provide a machine which will efficiently perform the work expected of it without injury to the tile.

Referring to the accompanying drawings, which are made a part hereof and on which similar reference characters indicate similar parts, Figures 1 and 1a show plan views of the machine, Figures 2 and 2a show side elevations, Figure 3, a section on line 3—3 of Figure 2, Figure 4, a section on line 4—4 of Figure 2, and Figure 5, a section on line 5—5 of Figure 2.

In the drawings numeral 10 indicates a frame upon which is positioned a belt supporting plate 11 over which a tile conveying belt 12 moves. The belt 12 supports tiles 13 positioned endwise in which position they are conveyed. The belt 12 is driven by a pulley 15, the other end of the belt passing over an idle pulley 14. Rollers 16 are positioned at intervals in the plate 11 over which rollers the belt travels to lessen friction between the belt and the plate. Driving pulley 15 is mounted on a shaft 17 on the other end of which shaft is a driving gear 18 which meshes with a pinion 19. Pinion 19 is mounted on a shaft carrying a pulley 20. The pulley 20 is driven from a pulley 21 by means of a crossed belt 22. The pulley 21 is loosely mounted on shaft 40 and is driven by a sliding clutch member 23. The clutch member 23 has a grooved portion 24 which is engaged by roller 25 on the end of a pivoted arm 26. A plate 27 having friction contact material 28 on its face engages a disk 29 made integral with or attached to pulley 21. The friction material 28 is held in contact with the disk 29 by means of springs 30. The lever 26 carries on one end a roller 31 which engages a side cam 32 of a plate 33, the plate being mounted on a shaft 34. The outer end of the shaft 34 carries a sprocket 35 over which passes a sprocket chain 36, the chain operating on a sprocket 37 on the shaft 38. The other end of the shaft 38 carries sprockets over which conveyor belts 39 travel. Clutch member 23 is splined to the shaft 40 which is driven by a chain 41 which chain operates on a sprocket 42 on the outer end of the shaft 34. From the structure so far described it may be seen that each rotation of the cam 33 rocks the lever 26 once to move the friction disk 28 out of and into contact with the disk 29, the disk 29 therefore will be driven a short distance at each revolution of the shaft 34, the distance through which the disk 29 is driven will be determined by the length of the cam portion 32 which determines the length of time during which the friction portion 28 is held in contact with the face of the disk 29. The distance through which the conveyor belt 12 is driven during this time will be determined by the relative sizes of the pulleys 20 and 21. These pulleys may be made to have the proper relative sizes to drive the belt as desired. It is desirable that the belt be driven a distance equal to the thickness of a tile as will presently appear.

The delivering end of the belt 12 will now be described. Near the end of the frame 10 is mounted a bridge 43. A buffer plate 44 is mounted on the bridge between guiding rollers 45. The buffer has a cushion facing 46 surrounding the vertical wall portion 47. The last tile on the conveyor engages against the face of the buffer by friction caused by the forward movement of the belt. The buffer plate 44 is actuated by means of a lever 49 which is pivoted to the frame 10 and attached at one end to the buffer plate and at its other end to a rod on the end of which is a roller 48. The roller 48 engages the periphery of the cam 33. The roller is held in engagement with the cam by a spring which seats against a portion of the frame 10. The buffer 44 is slotted at 50 to accommodate an escapement rocker 51 which is pivoted to the buffer at 52. The escapement device is provided with extensions 53 and 54 which form a support for the tile while the buffer is in the position shown in Figure 2. A vertical arm 55 is attached to and extends upward from the rocker 51 and rests against a bar 56. The bar 56 is supported in standards 57 and 58 which are attached to the bridge 43. A spring 59 is attached to the top of the wall 47 and attached at its other end to adjustable screw 60 in the arm 55. When the buffer is moved away from the tile by means of the arm 49 which is operated as described, the spring 59 holds the arm 55 against the bar 56 causing the rocker 51 to pivot at 52 so that the lower extensions 53 and 54 are moved out from under the tile and permit these tile to drop upon the conveyor 39. As shown the conveyor 39 is provided with a number of flexible tile receiving pads which are secured to the conveyor at 62 and are free at their other ends. When the tile is released from the conveyor 12 it drops down through a slot at 63. As soon as the lower end of the tile strikes a conveyor the tile is moved toward the left so that it is gently laid upon the conveyor face upwards. At 64 is provided a plate which receives the tiles after they have been moved from the conveyor 12. A cross bridge 65 is mounted upon standards 66 which are secured to the tile plate 11. Suitable springs 67 and 68 are secured in the bridge 65 and rest against the upper edges of the tile. This keeps the tile from tilting when the buffer is moved back to let the end tile drop down. The end of the spring 68 engages the last tile and assists in starting this tile downward when the buffer has been moved back. Guides 69 and 70 are provided at each side of the tiles to bring them in proper alignment with the conveyor 39. The loading edge of the plate 11 as shown at the right in Figure 2a is lined with a wooden strip 71 to cushion the tiles as they are placed on the belt 12. A movable weight 72 having a plate 73 which fits over the end of the last tile serves to hold the last tile vertically to hold the tiles in position on the conveyor.

While the machine has been described as a tile feeding machine it is not limited in its use to any particular article but may be used with any objects whose shape is such that they may be handled by a machine of this type.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:—

1. A tile feeder comprising an endless conveyor and means for intermittently driving the conveyor, a weighted hook for holding tile in an upright position on said conveyor, and an escapement device for releasing tile at the delivery end of the conveyor, means for intermittently operating the escapement device, and resilient means adjacent said escapement device for assisting in ejecting a tile upon the beginning of the operation of the said escapement device, substantially as set forth.

2. A tile feeding machine comprising a frame, a table on said frame, a conveyor belt movable across said table and means for intermittently moving said belt, a weighted hook for holding tile edgewise on the said belt, resilient means for retaining the tiles in proper position and an escapement means for delivering tile one at a time from the delivery end of said belt, substantially as set forth.

3. A tile feeding device comprising a conveyor belt, means for driving said belt, a weighted hook for holding tile on their edges on said belt, a reciprocating escapement device adjacent the delivery end of said belt, and a plurality of fixed springs engageable with the edge of the tile adjacent to the escapement device to assist in overcoming the friction between adjacent tile and to assist in ejecting the end tile from the conveyor belt, substantially as set forth.

4. A tile feeding machine comprising a table, a conveyor belt movable across the table, means for driving said belt intermittently comprising a clutch, a cam disk, a lever engageable with said cam disk and operably connected to said clutch whereby one rotation of said cam disk causes operation of said conveyor belt for a predetermined duration, an escapement device at the delivery end of said belt, comprising a slide mounted between rollers and having a vertical wall portion at one end, upstanding brackets adjacent said rollers, an adjustable stop-bar mounted in said brackets, an L-shaped lever pivoted in a slot in said slide with its vertical member spring-pressed against said stop-bar and its horizontal member projecting beyond said vertical wall to receive a tile, said pivoted lever adapted to be tilted to release said tile upon movement of said slide, a lever for operating said escapement device, said lever having means engaging with said cam to operate the escapement device in timed relation with operation of the said clutch, and resilient means engageable with an edge of a tile to overcome friction between the leading tiles and to assist in ejecting the end tile from the conveyor upon withdrawal of the escapement device, substantially as set forth.

5. A conveying machine comprising an endless conveyor, means for intermittently moving the conveyor, weighted means for holding articles on the conveyor, said means comprising a flat plate terminating in a hook and a weight mounted on said plate, an escapement device, and means for operating the escapement device alternately with the conveyor, substantially as set forth.

6. Means for conveying and feeding substantially flat articles comprising an endless conveyor, means for holding said articles in a substantially vertical position on the conveyor comprising a portable flat weight having a hooked end, means for driving the conveyor, resilient means at the delivery end of the conveyor for releasing the articles, substantially as set forth.

7. A conveyor-feeder machine for articles of such shape as will permit them to be placed neatly one against the other, weighted hook means for holding them in position when placed on the conveyor, and an escapement device at the delivery end of said conveyor, means for intermittently operating the escapement device and intermittently driving the said conveyor, said escapement device operating alternately once for each operation of the conveyor driving means, substantially as set forth.

In witness whereof, I have hereunto set my hand at Anderson, Indiana this twenty-fifth day of May, A. D. nineteen hundred and thirty-one.

JAMES ARTHUR BOWER.